(12) United States Patent
Park

(10) Patent No.: US 7,970,441 B2
(45) Date of Patent: *Jun. 28, 2011

(54) BATTERY AND BATTERY LOCKING UNIT OF MOBILE TERMINAL

(75) Inventor: Jun-Won Park, Anyang (KR)

(73) Assignee: LG Electronics Inc., Seoul (KR)

( * ) Notice: Subject to any disclaimer, the term of this patent is extended or adjusted under 35 U.S.C. 154(b) by 432 days.

This patent is subject to a terminal disclaimer.

(21) Appl. No.: 12/138,290

(22) Filed: Jun. 12, 2008

(65) Prior Publication Data

US 2008/0242368 A1 Oct. 2, 2008

Related U.S. Application Data

(63) Continuation of application No. 10/409,162, filed on Apr. 9, 2003, now Pat. No. 7,403,802.

(30) Foreign Application Priority Data

Apr. 11, 2002 (KR) .................. 10-2002-0019761
May 27, 2002 (KR) .................. 10-2002-0029264

(51) Int. Cl.
*H04M 1/00* (2006.01)

(52) U.S. Cl. .................. 455/572; 455/575.1; 455/575.8
(58) Field of Classification Search .................. 455/572, 455/575.1, 575.8
See application file for complete search history.

(56) References Cited

U.S. PATENT DOCUMENTS

| | | | | |
|---|---|---|---|---|
| 5,928,809 A * | 7/1999 | Ju | .................. | 429/100 |
| 6,395,980 B2 * | 5/2002 | Iitsuka | .................. | 174/50 |
| 6,549,791 B1 * | 4/2003 | Jeon et al. | .................. | 455/572 |
| 2002/0198018 A1 * | 12/2002 | Benson | .................. | 455/551 |

* cited by examiner

*Primary Examiner* — Creighton Smith
(74) *Attorney, Agent, or Firm* — Lee, Hong, Degerman, Kang & Waimey

(57) ABSTRACT

In a battery locking unit of a mobile terminal capable of increasing space usability of a terminal body and simplifying battery detachment operation by installing a battery locking unit on a cover, the locking unit consists of a battery installed at the rear of a terminal body; a cover attached/detached to/from the rear of the rear body by a sliding method and protecting the battery; and a locking unit installed at a certain side of the cover, locking the cover to the terminal body by restricting the sliding movement of the cover and releasing the locking of the cover by a pressing operation of a user.

1 Claim, 12 Drawing Sheets

BATTERY AND BATTERY LOCKING UNIT OF MOBILE TERMINAL

This application is a continuation of U.S. application Ser. No. 10/409,162, filed Apr. 9, 2003, issued as U.S. Pat. No. 7,403,802, which pursuant to 35 U.S.C. §119(a), claims the benefit of earlier filing date and right of priority to Korean Patent Application No. 10-2002-0019761, filed on Apr. 11, 2002 and Korean Patent Application No. 10-2002-0029264, filed on May 27, 2002, the entire contents of which are hereby incorporated by reference.

BACKGROUND OF THE INVENTION

1. Field of the Invention

The present invention relates to a battery and a battery locking unit of a mobile terminal, and in particular to a battery and a battery locking unit of a mobile terminal capable of detaching/attaching a battery from/to a terminal body easily and increasing space usability of a mobile terminal.

2. Background of the Related Art

FIG. 1 is a front view illustrating the conventional mobile terminal, and

FIG. 2 is a sectional view illustrating the mobile terminal in FIG. 1 taken along the line I-I.

In the conventional mobile terminal, a battery 104 is attached to the rear of a terminal body 102, and a locking unit for locking the battery 104 is installed in the terminal body 102.

As depicted in FIG. 2, the locking unit consists of a hook 106 installed at the rear of the terminal body 102 so as to be movable up and down; a spring 108 installed between the hook 106 and the terminal body 102 for providing a certain elastic force to the hook 106; and a locking groove 112 formed at the upper surface of the battery 104 and locking the hook 106 so as to be engaged with the hook 106.

The hook 106 consists of a handle portion 114 projected outwardly so as to be handled by a user; a spring installation portion 116 at which the spring is installed; and a locking protrusion 110 locked to the locking groove 112 of the battery 104.

In the conventional battery locking unit of the mobile terminal, when the battery 104 is mounted onto the rear of the terminal body 102 and is pushed upwardly, the locking groove 112 of the battery 104 is inserted-locked into the locking protrusion 110 of the hook 106. Herein, by the elastic force of the spring 108, the locking groove 112 of the battery 104 is locked to the locking protrusion 110 of the hook 106, and accordingly the battery 104 is fixed to the terminal body 102.

In that state, as depicted in FIG. 3, in order to separate the battery from the terminal body 102, if the user pulls the handle portion 114 in an A direction, the locking groove 112 is separated from the locking protrusion 110. Afterward, when the user pulls the battery in a B direction, the battery 104 is separated from the terminal body 102.

However, in the conventional mobile terminal, because the locking unit for locking the battery is installed in the terminal body, a space for installing the locking unit is required, and accordingly space usability of the terminal body may be lowered.

In addition, in the locking unit, in order to release the locking of the battery, the user has to separate the battery from the body with one hand while pulling the handle portion of the hook, and accordingly it is intricate.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

One embodiment of the present invention provides a battery locking unit of a mobile terminal which is capable of improving space usability of a terminal body and simplifying detachment operation of a battery by installing a locking unit onto a cover.

Another embodiment of the present invention provides a battery locking unit of a mobile terminal which is capable of preventing a battery from being separated from a terminal body although impact acts on the terminal by fixing the battery to the terminal body stably.

Another embodiment of the present invention provides a battery locking unit of a mobile terminal which is capable of reducing a thickness of a battery by improving a structure of the battery.

A battery of a mobile terminal in accordance with one embodiment of the present invention includes a storage cell at which a PCB for power connection is installed; a casing body having a PCB insertion portion for inserting the PCB and arranged on the circumference of the storage cell; an upper casing arranged on the top surface of the storage cell and fixed to the casing body; and a lower casing arranged on the bottom surface of the storage cell and fixed to the casing body.

In one aspect of this embodiment, upper engaging protrusions are formed at the side surface of the casing body at regular intervals in order to fix the upper casing, and lower engaging protrusions are formed at the side surface of the casing body at regular intervals in order to fix the lower casing.

In another aspect of this embodiment, a protrusion portion is projected from a certain side surface of the casing body in order to engage with a supporting protrusion formed at a terminal body when the battery is installed on the terminal body.

In another aspect of this embodiment, the casing body is made of synthetic resin material.

In another aspect of this embodiment, the edge of the upper casing is curved downwardly as a certain width, and upper engaging holes are respectively formed at both curved sides of the upper casing so as to receive upper engaging protrusions of the casing body.

In another aspect of this embodiment, the upper casing is made of stainless material.

In another aspect of this embodiment, The edge of the lower casing is curved upwardly as a certain width and lower engaging holes are respectively formed at both curved sides of the lower casing so as to receive lower engaging protrusions of the casing body.

In another aspect of this embodiment, a separation preventive protrusion is formed at the outer surface of the casing body so as to project more than a thickness of the upper/lower casings as a certain length in order to prevent the upper/lower engaging protrusions from being separated from the upper/lower engaging holes of the upper/lower casings.

A locking unit of a mobile terminal in accordance with one embodiment of the present invention includes a battery installed at the rear of a terminal body; a cover attached and detached to the rear of the terminal body by a sliding method in order to protect the battery; and a locking unit installed at a certain side of the cover, locking the cover to the terminal body by restricting the sliding movement of the cover and releasing the locking of the cover by pressing operation of a user.

In one aspect of this embodiment, a guide portion is respectively formed at both side surfaces of the terminal body in order to guide the sliding movement of the cover in the length direction.

In another aspect of this embodiment, each receiving groove is formed at both sides of the terminal body, each inserting protrusion is formed at both upper sides of the cover, and the upper portion of the cover is fixed to the terminal body by inserting the inserting protrusion into the receiving groove.

In another aspect of this embodiment, each guide groove is formed at both lower sides of the terminal body, each guide protrusion is formed at both lower sides of the cover, and the lower portion of the cover is fixed to the terminal body by inserting the guide protrusion into the guide groove.

In another aspect of this embodiment, the locking unit includes a locking member in which a certain side is rotatively hinge-connected to an installation portion respectively formed at both sides of the cover and engaged with the protrusion portion respectively formed at both sides of the terminal body in order to lock the cover; and a spring installed between the inner surface of the locking member and the internal wall of the installation portion in order to provide a certain elastic force to the locking member.

In another aspect of this embodiment, the locking member includes a hinge pin formed at a side so as to be inserted into the hinge groove; a separation preventive protrusion formed at the other side in order to prevent separation from the cover; a button portion formed at the outer surface so as to be pressed by a user; a seat portion formed at the inner surface in order to support a side of the elastic member; and a locking protrusion formed at the side surface so as to be engaged with the protrusion portion formed at the terminal body in order to restrict the linear movement of the cover.

In another aspect of this embodiment, a supporting plate is combined with the cover in order to prevent the locking member from being separated from the installation portion of the cover.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

Hereinafter, embodiments of a battery and a battery locking unit of a mobile terminal in accordance with the present invention will be described with reference to accompanying drawings.

There can be plural embodiments, hereinafter the preferred embodiments will be described.

Figure 1:
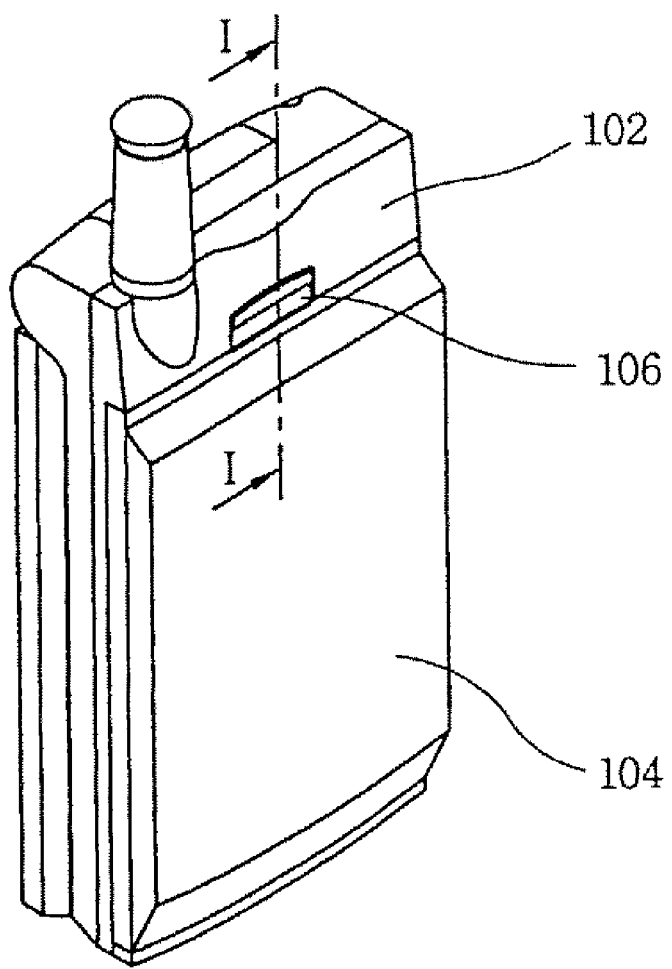
FIG. 1 is a front view illustrating the rear of the conventional mobile terminal.
Figure 2:
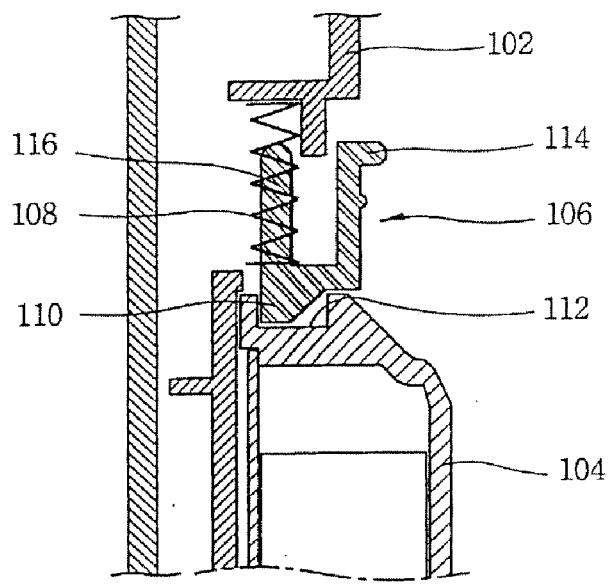
FIG. 2 is a sectional view illustrating a battery locking structure of the conventional mobile terminal in FIG. 1 taken along the line I-I.
Figure 3:
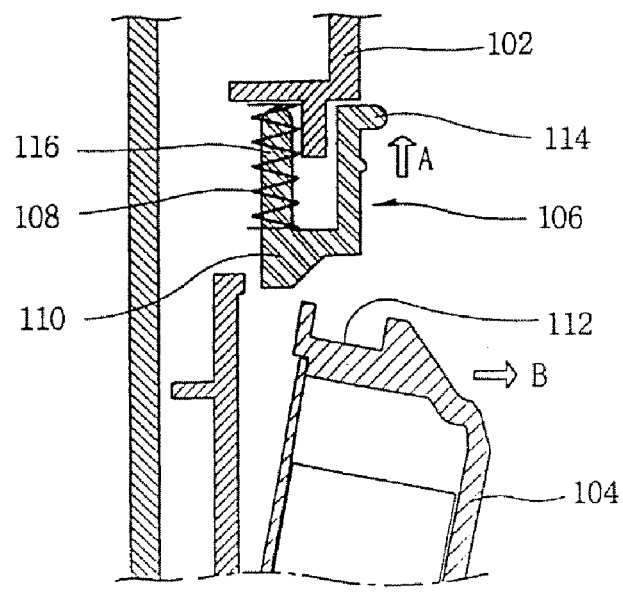
FIG. 3 is a sectional view illustrating a battery structure of the conventional mobile terminal.
Figure 4:
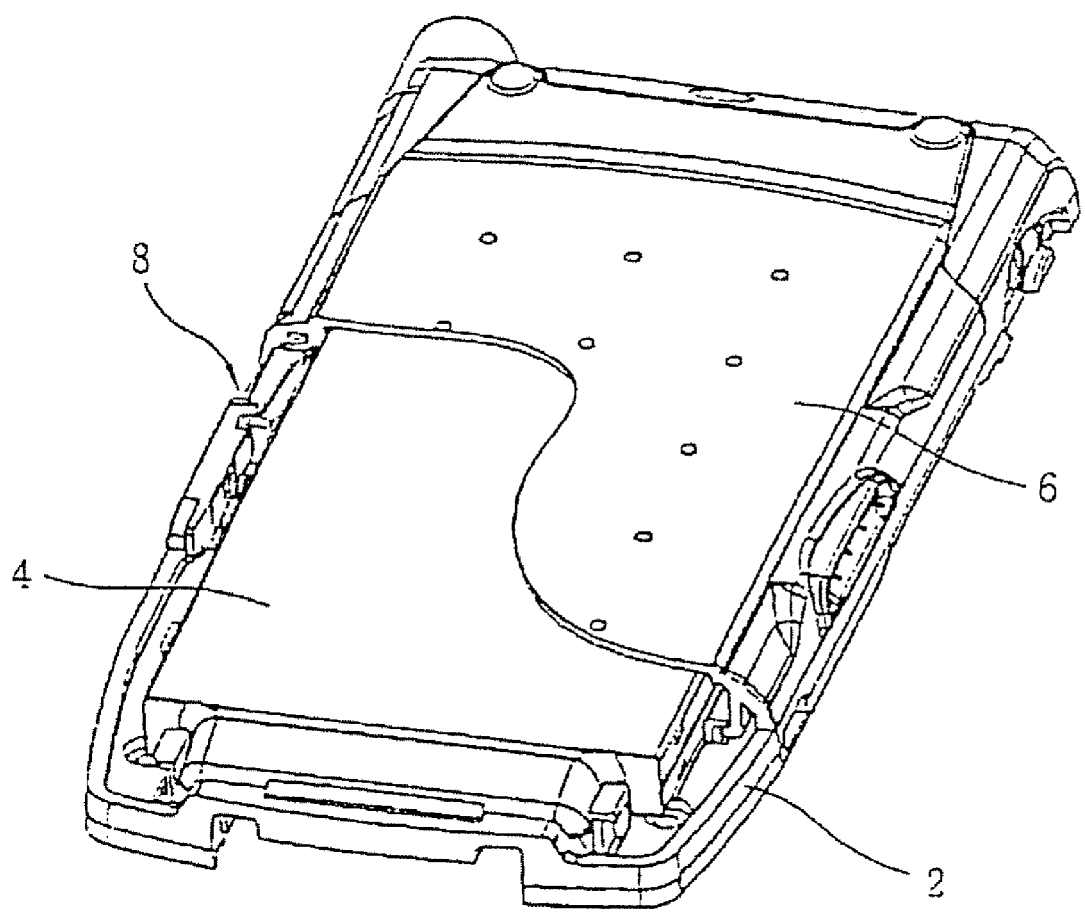
FIG. 4 is a sectional-perspective view illustrating a mobile terminal in accordance with an embodiment of the present invention.

FIG. 4 is a sectional-perspective view illustrating a mobile terminal in accordance with an embodiment of the present invention. The mobile terminal includes a terminal body 2 at which a circuit substrate is disposed in and various operation buttons for operating the terminal are installed on; a battery 4 attached to the rear of the terminal body 2; a cover 6 detachably installed at the rear of the terminal body 2; and a locking unit 8 installed at the both sides of the cover and locking the cover 6 to the terminal body 2.

Figure 5:
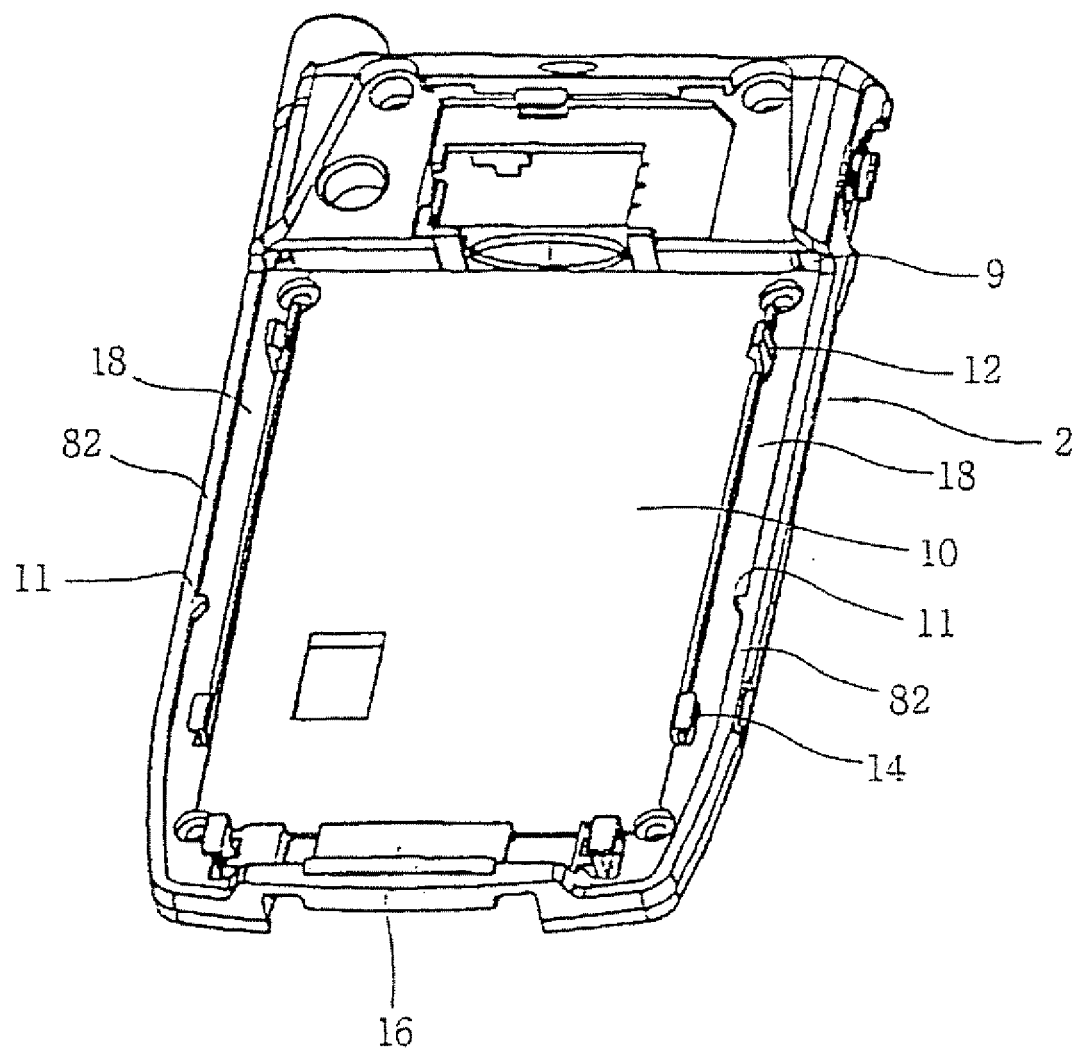
FIG. 5 is a sectional-perspective view illustrating a terminal body of the mobile terminal in accordance with an embodiment of the present invention in a battery detachment state.

As depicted in FIG. 5, in the terminal body 2, an installation portion 10 for installing the battery 4 is formed at the rear, a supporting protrusion 12 is formed at the both sides of the installation portion 10 in order to support the battery 4 installed on the installation portion 10, and a power connecting unit 16 is formed at the terminal body 2 so as to be connected to the battery 4 electrically.

And, a guide road 18 for guiding a linear movement of the cover 6 is respectively formed at the both sides of the terminal body 2 in the length direction, a receiving hole 9 for fixing the upper portion of the cover 6 is respectively formed at the both upper-sides of the terminal body 2, a guide groove 14 is formed at the both bottom-sides of the terminal body 2 in order to support the bottom portion of the cover 6, and a protrusion portion 11 for locking operation of the cover 6 is formed at a certain portion of the guide road 18.

The guide road 18 is formed so as to have a certain width at the both sides of the terminal body 2 by each rib 82, and the protrusion portion 11 is projected as a certain length toward the inside of the guide road 18.

Figure 6:
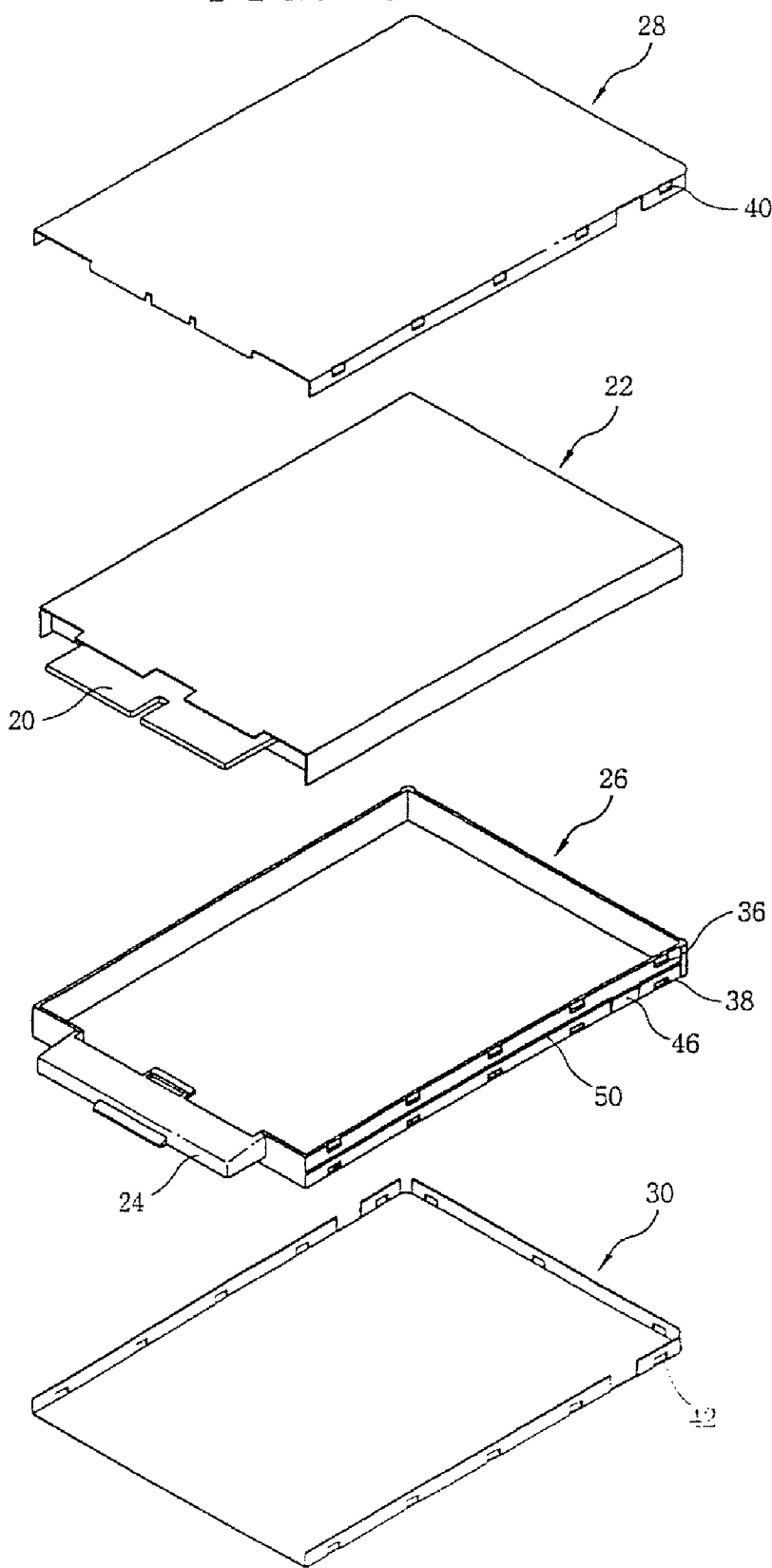
FIG. 6 is an exploded-perspective view illustrating a battery in accordance with an embodiment of the present invention.
Figure 7:
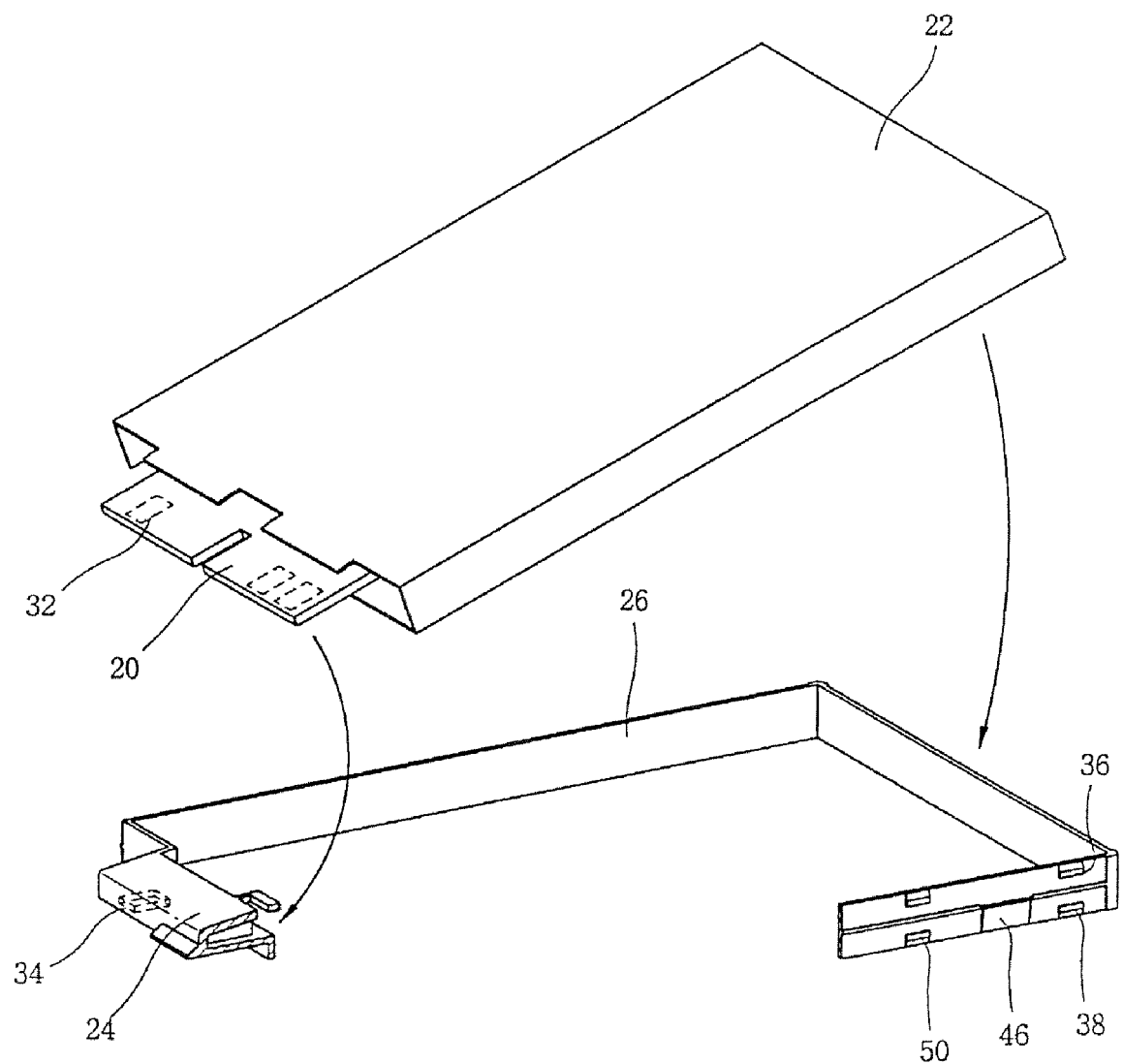
FIG. 7 is a perspective view illustrating an assembly structure of the battery in accordance with an embodiment of the present invention.
Figure 8:
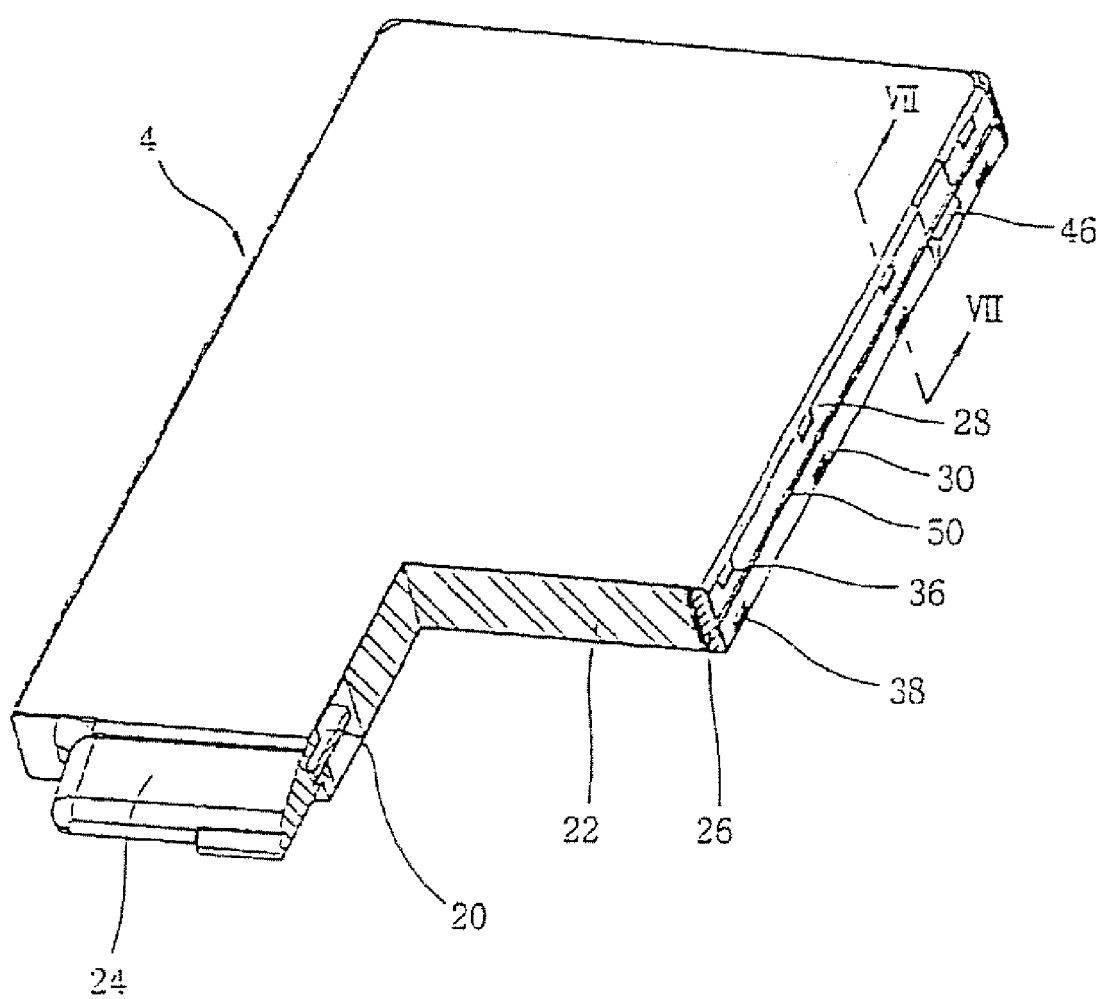
FIG. 8 is a sectional-perspective view illustrating the battery of the mobile terminal in accordance with an embodiment of the present invention.

FIG. 6 is an exploded-perspective view illustrating a battery in accordance with an embodiment of the present invention, FIG. 7 is a perspective view illustrating an assembly structure of construction parts of the battery in accordance with an embodiment of the present invention, and FIG. 8 is a sectional-perspective view illustrating the battery of the mobile terminal in accordance with an embodiment of the present invention.

The battery 4 consists of a storage cell 22 at which a PCB 20 for power connection is installed; a casing body 26 having a PCB insertion portion 24 for inserting the PCB 20 and arranged on the circumference of the storage cell 22; an upper casing 28 arranged on the top surface of the storage cell 22 and fixed to the casing body 26; and a lower casing 30 arranged on the bottom surface of the storage cell 22 and fixed to the casing body 26.

As depicted in FIG. 7, the casing body 26 has a rectangular shape, in more detail, the upper/bottom surface is respectively open, and it has the same height with a thickness of the storage cell 22. The PCB insertion portion 24 is formed at a certain side surface as one body, and a connection terminal 34 is disposed in the PCB insertion portion 24 so as to be contacted to a power terminal 32 formed at the PCB 20 and be exposed to the outside. Herein, the PCB insertion portion 24 is inserted into the power connection portion 16 of the terminal body 2 and is electrically connected to the terminal body 2.

And, an upper engaging protrusion 36 is respectively formed at the external side surface of the casing body 26 at regular intervals in order to fix the upper casing 28, and a lower engaging protrusion 38 is respectively formed at the external side surface of the casing body 26 at regular intervals in order to fix the lower casing 30. And, a supporting portion 46 is formed at a certain portion of the both sides of the casing body 26 so as to be engaged with the supporting protrusion 12 of the terminal body 2 when the battery 4 is mounted onto the terminal body 2.

It is preferable for the casing body 26 to be made of synthetic resin material.

The upper casing 28 has a thin flat plate shape, and its edge is curved downwardly as a certain width. An upper engaging hole 40 is respectively formed at the curved both sides of the upper casing 28 so as to receive the upper engaging protrusion 36 of the casing body 26.

The lower casing 30 has a thin flat plate shape, and its edge is curved upwardly as a certain width. A lower engaging hole 42 is respectively formed at the curved both sides of the lower casing 30 so as to receive the lower engaging protrusion 38 of the casing body 26.

It is preferable for the upper and lower casings 28, 30 to be made of metal material, in particular, stainless material.

Herein, a separation preventive protrusion 50 is formed at both long sides of the casing body 26 in order to prevent separation of the upper/lower engaging protrusion 36, 38 from the upper/lower engaging hole 40, 42 of the upper/lower casing 28, 30 after they are combined with each other.

Figure 9:
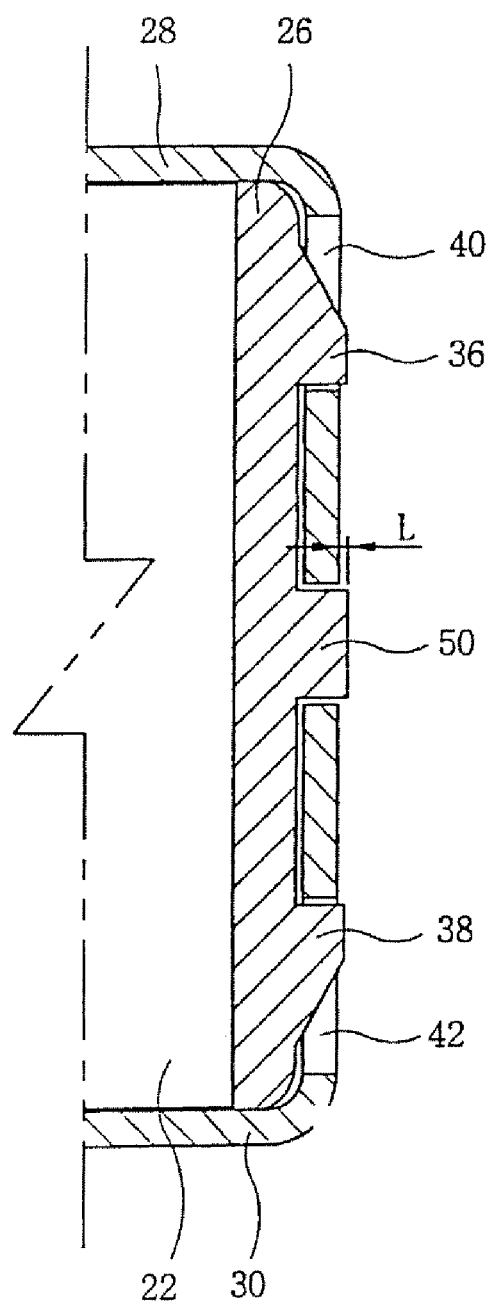
FIG. 9 is a sectional view illustrating the battery in FIG. 8 taken along the line VII-VII.

Herein, as depicted in FIG. 9, the separation prevention protrusion 50 is projected outwardly more than a thickness of the upper/lower casing 28, 30 as a certain length L in order to prevent the upper and lower casings 28, 30 from being separated from the casing body 22.

Figure 10:
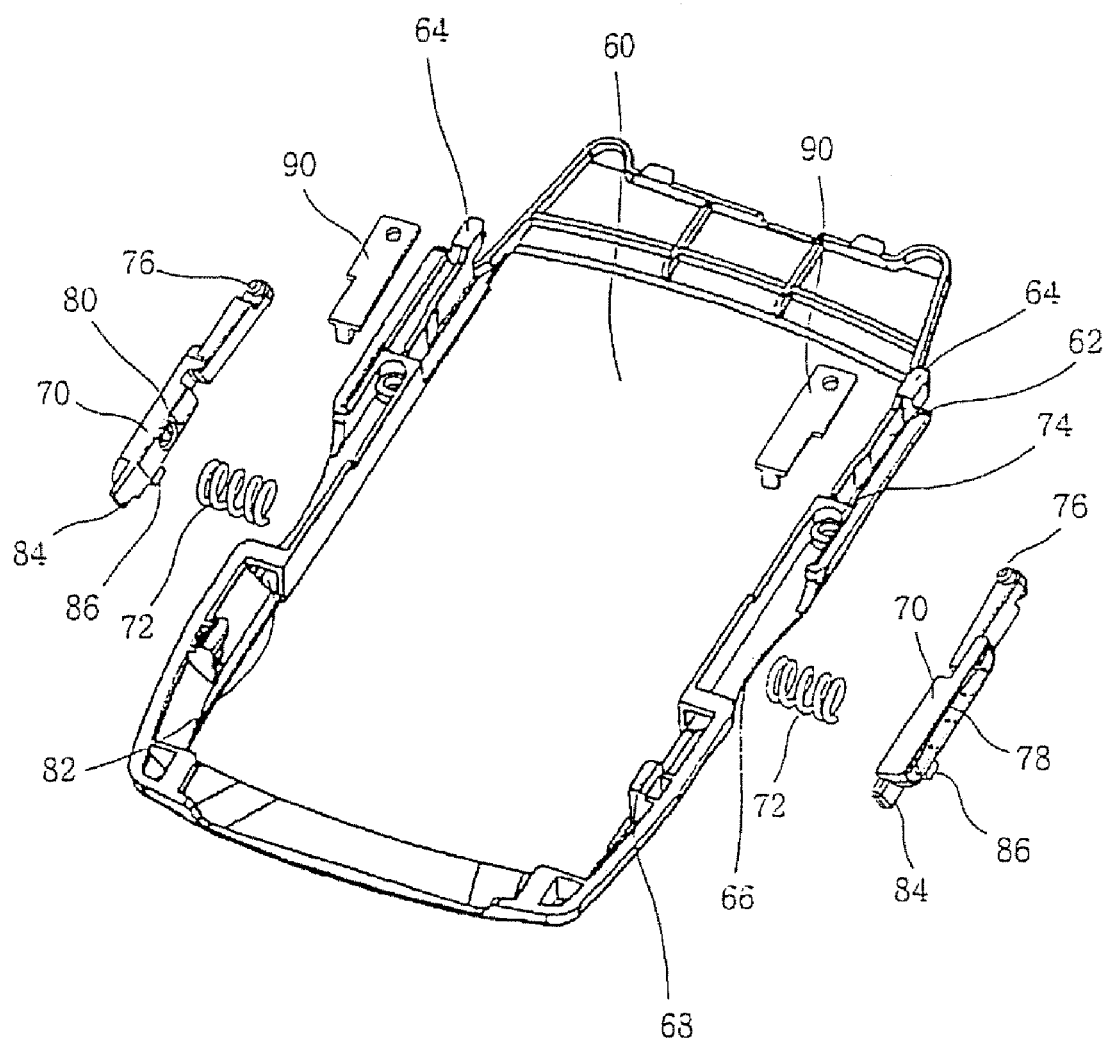
FIG. 10 is an exploded-perspective view illustrating a cover of the mobile terminal in accordance with an embodiment of the present invention.
Figure 11:
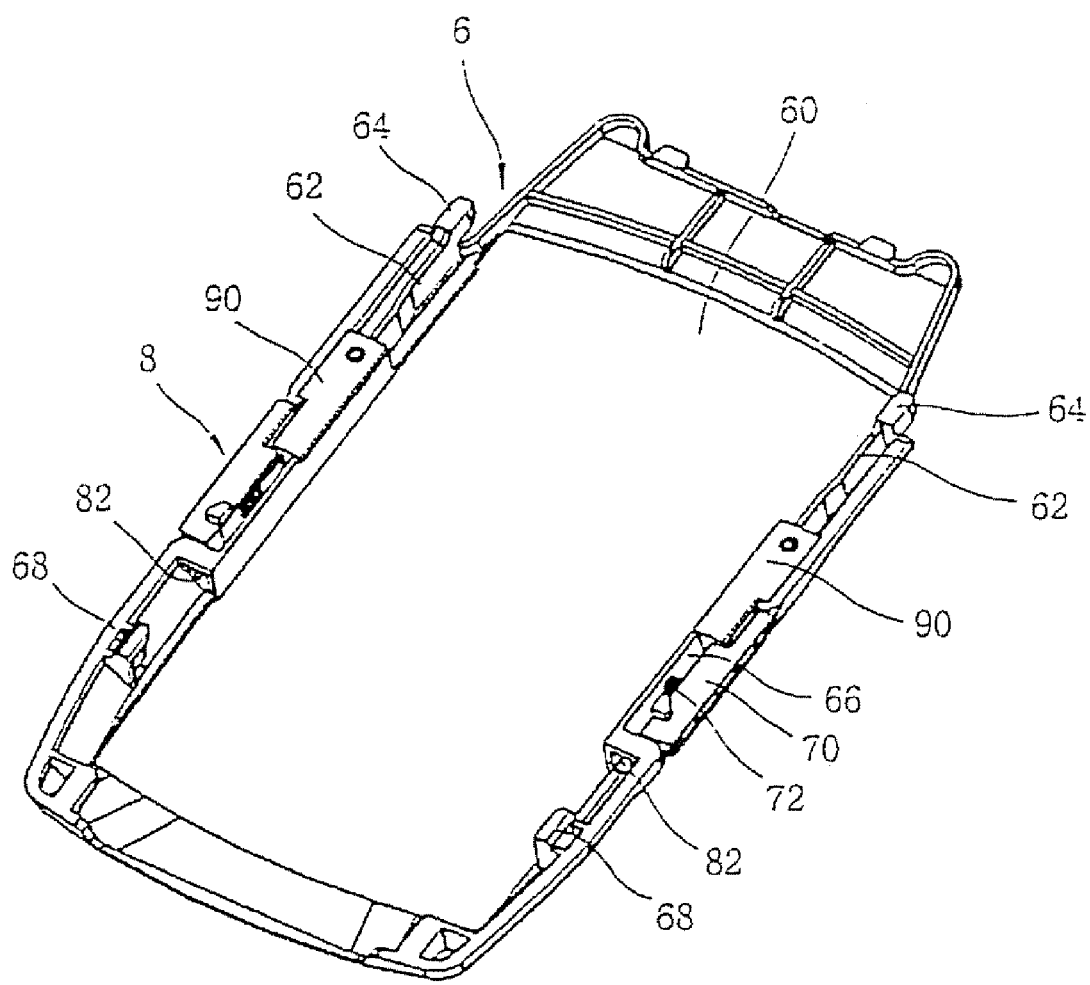
FIG. 11 is a perspective view illustrating the cover of the mobile terminal in accordance with an embodiment of the present invention.

FIG. 10 is an exploded-perspective view illustrating a cover of the mobile terminal in accordance with an embodiment of the present invention, and FIG. 11 is a perspective view illustrating the cover of the mobile terminal in accordance with an embodiment of the present invention.

The cover 6 consists of a cover body 60 mounted onto the top surface of the battery 4 aid including a rib 62 having a certain height in the circumferential direction; an inserting protrusion 64 respectively formed at both front sides of the cover body 60 and inserted into the receiving hole 9 of the terminal body 2; an installation portion 66 respectively formed at the center both sides of the cover body 60 and having a certain space for installing the locking unit 8; and a guide protrusion 68 respectively formed at both lower sides of the cover body 60 and inserted into the guide groove 14 of the terminal body 2.

Herein, the inserting protrusion 64 is projected toward the upper portion of the cover as a certain length and is inserted into the receiving hole 9 of the terminal body 2 in order to fix the upper portion of the cover 6 to the terminal body 2. And, the guide protrusion 68 is inserted into the guide groove 14 of the terminal body 2 in order to fix the lower portion of the cover 6 to the terminal body 2, and the locking unit 8 maintains the locking state of the cover 6 by preventing the cover from moving downwardly.

The locking unit 8 consists of a locking member 70 rotatively hinge-connected to the installation portion 66 of the cover 6 and engaged with the protrusion portion 11 of the terminal body 2 in order to lock the length direction movement of the cover 6; and an elastic member 72 installed at the inner surface of the locking member 70 and the internal wall of the installation portion 66 in order to provide an elastic force for pushing the locking member 70 outwardly.

Herein, in the locking member 70, a hinge pin 76 inserted into a hinge groove 74 at a certain side of the installation portion 66 is formed at a certain end, a button portion 78 pushed by the user is formed at the outer surface, a seat portion 80 for supporting the side of the elastic member 72 is formed at the inner surface, a separation preventive protrusion 84 inserted into a separation preventive groove 82 formed at a certain side of the installation portion 66 is formed at the other end in order to prevent the locking member 70 from being separated by the elastic force of the elastic member 72, and a locking protrusion 86 is formed at the side surface so as to be engaged with the protrusion portion 11 of the terminal body 2 in order to restrict the linear movement of the cover 6.

And, a supporting plate 90 covers the locking member 70 in order to maintain the installation state of the locking member 70 (it is installed on the installation portion 66 of the cover 6), and the supporting plate 90 is combined with the cover 6.

It is preferable to use a coil spring as the elastic member 72.

The assembly process of the battery of the mobile terminal in accordance with the present invention will be described.

First, the PCB 20 of the storage cell 22 is inserted into the PCB insertion portion 24 of the casing body 26, and the storage cell 22 is inserted into the casing body 26. Herein, the power terminal 32 of the PCB 20 is electrically contacted to the connection terminal 34 of the PCB insertion portion 24.

Afterward, the upper casing 28 covers the top surface of the storage cell 22, a certain force acts thereon, and the upper engaging hole 40 of the upper casing 28 is respectively inserted-fixed to the upper engaging protrusion 36 of the casing body 26. And, the lower casing 30 covers the bottom surface of the storage cell 22, a certain force acts thereon, and the lower engaging hole 42 of the lower casing 30 is respectively inserted-fixed to the lower engaging protrusion 38 of the casing body 26.

Herein, because the curved edge itself at which the upper/lower engaging hole 40, 42 of the upper/lower casing 28, 30 are formed has a certain elastic force, the inserted-attached state is maintained. And, in particular, because the protrusion portion 50 respectively formed at the both sides of the casing body 26 projects outwardly more than a thickness of the upper/lower casing 28, 30 as a certain length, it is possible to prevent the upper/lower casing 28,30 from being separated from the casing body 26.

In the battery 4, because the upper/lower casings 28, 30 are made of stainless material, it is possible to reduce a thickness of the terminal in comparison with the conventional fabrication using synthetic resin material.

Installing the battery 4 to the terminal body 2 will be described.

First, the PCB insertion portion 24 of the battery 4 is inserted into the power connection portion 16 formed at the rear lower portion of the terminal body 2, the battery 4 is mounted onto the installation portion 10 of the terminal body 2, a certain outer force acts thereon, the supporting portion 46 formed at the both sides of the battery 4 is respectively inserted into the supporting protrusion 12 formed at the terminal body 2, and the combination of the battery 4 and the terminal body 2 is maintained by the elastic force of the supporting protrusion 12.

Afterward, the cover 6 for protecting the battery 4 is installed on the rear of the terminal body 2.

Figure 12:
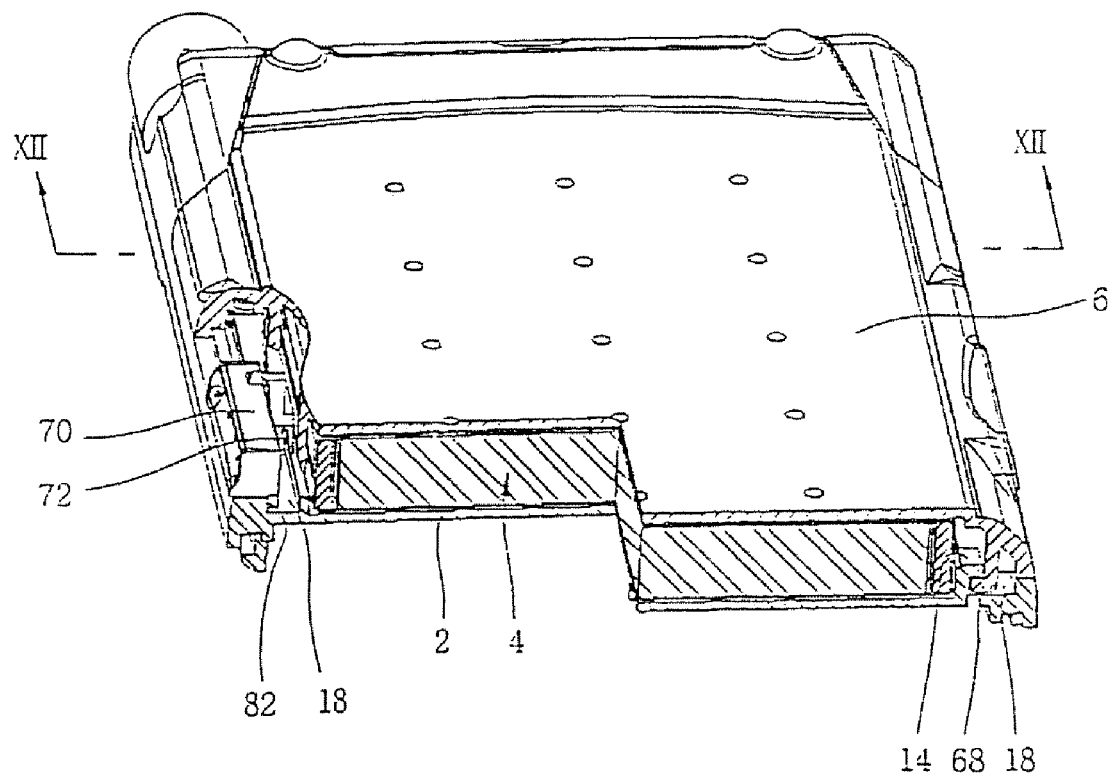
FIG. 12 is a sectional-perspective view illustrating the mobile terminal in accordance with an embodiment of the present invention in an assembled state.
Figure 13:
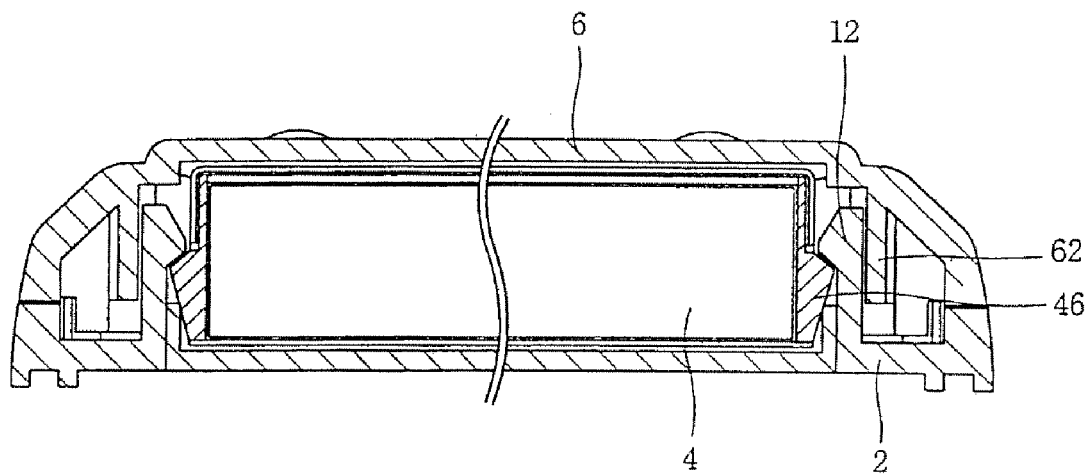
FIG. 13 is a sectional view illustrating the mobile terminal in FIG. 12 taken along the line XII-XII.

FIG. 12 is a partial perspective view illustrating the mobile terminal in accordance with an embodiment of the present invention in an assembled state, and FIG. 13 is a sectional view illustrating the mobile terminal in FIG. 12 taken along the line XII-XII.

The attachment process will be described in more detail. After installing the cover 6 onto the rear of the terminal body 2 at which the battery 4 is installed and pushing the cover 6 upwardly, the rib 62 respectively formed at the both sides of the cover 6 moves upwardly along the guide road 18 of the terminal body 2. Herein, as depicted in FIG. 13, the rib 62 of the cover 6 contacts to the rear of the supporting protrusion 12 formed at the terminal body 2, it is possible to prevent the supporting protrusion 12 from being separated from the supporting portion 46 of the battery 4, and accordingly the battery 4 can maintain the attachment state stably.

And, when the cover 6 moves toward the upper portion of the terminal body 2, the inserting protrusion 64 formed at the upper portion of the cover 6 is inserted into the receiving groove 9 of the terminal body 2, and the upper portion of the cover 6 is fixed to the terminal body 2. And, at the same time, the guide protrusion 68 formed at the lower portion of the cover 6 is inserted into the guide groove 14 of the terminal body 2, and accordingly the lower portion of the cover 6 is fixed to the terminal body 2.

And, at the same time, the locking unit 8 is locked to the protrusion portion 11 of the terminal body 2, and accordingly the cover 6 is locked to the terminal body 2.

In more detail, when the cover 6 moves along the guide road 18 of the terminal body 2, the locking protrusion 86 of the locking member 70 engages with the protrusion portion 11 of the terminal body 2, the engaging state is maintained by the elastic force of the elastic member 72, and accordingly it is possible to restrict the cover 6 from moving downwardly.

As described-above, when the battery 4 and the cover 6 are attached to the terminal body 2, detaching the battery 6 from the terminal body 2 will be described.

First, when the user presses the button portion 78 of the locking member 70, the locking member 70 is rotated centering around the hinge pin 76, and the locking protrusion 86 is separated from the protrusion portion 11 of the terminal body 2. In that state, when the user pulls the cover 6 downwardly, the inserting protrusion 64 formed at the upper portion of the cover 6 is separated from the receiving groove 9 of the terminal body 2, and the cover is separated from the terminal cover 2. Afterward, when the battery 4 is separated from the installation portion 10, the detachment process is finished.

Advantageous of the folder type mobile terminal in accordance with the present invention will be described.

By arranging a casing body on the circumference of a storage cell, arranging an upper casing on the top surface of the storage cell and arranging a lower casing on the bottom surface of the storage cell, the upper and lower casings are respectively attached to the casing body. In addition, by fabricating the upper and lower casings with metal material, it is possible to reduce a thickness of a battery.

And, in the battery locking unit of the mobile terminal in accordance with the present invention, by installing a locking unit on a cover for protecting a battery, space usability of a terminal body can be improved.

In addition, in the battery locking unit of the mobile terminal in accordance with the present invention, when a user presses a pressing portion of a locking member and pulls it, a cover is separated from a terminal body easily, and accordingly it facilitates detachment of a battery.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile terminal, comprising:
   a terminal body;
   a battery installation portion located within the terminal body and sized to receive a battery, wherein the installation portion comprises protrusions for securing the battery;
   a cover slideably attachable to the terminal body and positionable to enclose the battery within an enclosure defined by the terminal body and the cover;
   a locking device integrated with the cover to releasably secure the cover in a closed position, wherein the locking device is configured to release the cover from the closed position in response to a pushing force;
   inserting protrusions formed in the cover;
   receiving portions formed on the terminal body, wherein the receiving portions are individually sized to receive one of the inserting protrusions;
   guide grooves formed along opposing sides of the terminal body; and
   guide protrusions formed along opposing sides of the cover,
   wherein the guide protrusions are individually sized to slideably cooperate with one or more of the guide groves.

* * * * *